United States Patent [19]
Udaka

[11] Patent Number: 5,880,872
[45] Date of Patent: Mar. 9, 1999

[54] OPTICAL DEVICE AND ELECTROLYTIC SOLUTION

[75] Inventor: Toru Udaka, Kanagawa, Japan

[73] Assignee: Sony Corporation, Tokyo, Japan

[21] Appl. No.: 933,525

[22] Filed: Sep. 18, 1997

[30] Foreign Application Priority Data

Sep. 20, 1996 [JP] Japan .................................... 8-271537

[51] Int. Cl.⁶ .................................................. G02F 1/153
[52] U.S. Cl. ......................... 359/273; 359/269; 359/272; 359/270
[58] Field of Search ..................... 359/269, 270, 359/272, 273, 275; 430/363, 505, 518

[56] References Cited

U.S. PATENT DOCUMENTS

| | | | |
|---|---|---|---|
| 4,427,267 | 1/1984 | Collins et al. ........................ | 359/270 |
| 4,773,740 | 9/1988 | Kawakami et al. .................... | 359/270 |
| 5,231,531 | 7/1993 | Defendini et al. ..................... | 359/275 |
| 5,379,146 | 1/1995 | Defendini ............................. | 359/275 |
| 5,764,401 | 6/1998 | Udaka et al. ......................... | 359/270 |
| 5,768,004 | 6/1998 | Cogan ................................. | 359/269 |

*Primary Examiner*—Loha Ben
*Attorney, Agent, or Firm*—Hill & Simpson

[57] ABSTRACT

An optical device in which a solution prepared by dissolving a silver halide in a solvent and adding an alkali metal halide such as LiBr as a support salt is disposed between working electrodes and counter electrode, and which is adapted such that silver is deposited or dissolved by driving control for the electrodes. The optical device can be driven at a low power consumption, can control the light transmittance or reflectance in a visible light region, has satisfactory spectral characteristics upon light shielding and can prevent an overvoltage to the electrode, thereby enabling to increase the working life, and an electrolytic solution used therefor is provided.

20 Claims, 7 Drawing Sheets

OPTICAL DEVICE AND ELECTROLYTIC SOLUTION

BACKGROUND OF THE INVENTION

1. Field of the Invention

The present invention relates to an optical device (for example, a display device for conducting display of numerical figures or letters or X–Y matrix display, and a filter capable of controlling light reflectance or light transmittance in a visible light region (wavelength: 400 to 700 nm)), as well as an electrolytic solution used for the device.

2. Description of the Related Art

Heretofore, electrochromic materials (hereinafter sometimes referred to as EC materials) have been used for voltage driving type display devices and adopted, for example, in digital clocks and the like for time display, The electrochromic display device (hereinafter sometimes referred to as ECD) is a non-light emitting type display device and since it conducts display by reflection light or transmission light, it has an advantageous merit of reducing feeling of fatigue even after long time observation, as well as an advantageous merit such as relatively low driving voltage which reduces power consumption. For example, as disclosed in Japanese Patent Laid-Open Sho 59-24879, a liquid type ECD using, as the EC material, a biologen molecule derivative of an organic molecular type of providing colored and discolored states reversibly.

Along with development of precise optical instruments, light amount controlling devices which are fine in the size and consume less electric low power are required for replacing existent variable ND filters, and it becomes necessary to study if the ECD described above or techniques relevant thereto are adaptable or not.

However, in a case of utilizing the EC material, for example, the viologen molecule derivative to the ECD, there has been a problem in the response speed required actually and the shield performance and it has been difficult to put the material to practical use.

In view of the above, an electrochemical light controlling device using deposition/dissolution of silver has been developed in place of ECD taking notice on a transmitting type or reflection type light controlling device utilizing deposition/dissolution of a metal salt.

However, in the electrochemical light controlling device described above, while aimed values can be obtained for the response speed and the light shielding performance, a transparent electrode as a substrate (that is, a working electrode) tends to suffer from degradation and the working life as a device is short.

Particularly, since an overvoltage is applied to an ITO (indium tin oxide) electrode upon deposition and dissolution of silver, the electrode is liable to be damaged.

SUMMARY OF THE INVENTION

It is, accordingly, an object of the present invention to provide an optical device capable of lowering the overvoltage to the electrode thereby attaining a long life by using a silver complex salt as an electrolytic solution required for the device, a solution of which has no absorption in a visible light region (400 to 700 nm) and can provide substantially uniform shielding in the visible light region upon coloration as an electrochemical light controlling device material, as well as an electrolytic solution used therefor.

The present inventor has found a stable optical device and an electrolytic solution capable of driving at a low power consumption and controlling the optical transmittance or reflectance in a visible light region, having satisfactory spectral characteristics and reducing the damages of the electrode, by constituting a light controlling device using an electrochemical material by obtaining a reversible system of depositing silver from a silver complex salt onto an electrode or dissolving silver from the electrode in a non-aqueous system (hereinafter simply referred to as "deposition and dissolution"), and has accomplished the present invention.

That is, the present invention concerns an optical device in which a solution of a silver halide (for example, AgF, AgCl, AgBr, and AgI) is disposed between working electrodes and counter electrode, which is adapted to cause deposition and dissolution of silver by driving control of the electrodes and in which at least one salt selected from the group consisting of LiX, NaX and KX (in which X is a fluorine atom, chlorine atom, bromine atom or iodine atom) is added as a support salt capable of supplying a halogen identical with or different from that of the silver halide for dissolving the silver halide, and the silver halide is formed into a complex salt, as well as an electrolytic solution comprising the solution described above and used for the optical device.

Heretofore, even if an electrolytic solution substantially at a practical level is obtained, since the transparent electrode as the substrate (that is, working electrode) is degraded by repeating driving, the working life is short. According to the present invention, since an alkali metal halide of the present invention such as LiX described above is added to the electrolytic solution, an overvoltage regarding deposition and dissolution of silver can be reduced compared with quaternary ammonium salts used so far for the dissolution of silver salts, and this can contribute to the increase of the electrode life.

The present inventor has obtained a highly reversible system by adding an appropriate additive to an electrolytic solution containing various silver complex salts in the materials for electrolytic solutions. The electrolytic solution has been studied by using silver iodide, silver bromide and silver chloride as the silver halide.

For dissolving the silver halide described above, it is necessary to form silver into a complex salt. However, quaternary ammonium salts easily soluble to organic solvents have been used mainly for support salts therefor (no direct concern with the reaction but necessary for dissolving silver). Since it has been found that lowering of the driving voltage is important in order to increase the working life of the electrode, it is desirable for such an electrolytic solution as reducing overvoltage upon deposition and dissolution of silver.

According to the present invention, degradation of the electrode (particularly, transparent ITO electrode) can be avoided by lowering the overvoltage upon dissolution of the deposited silver film by using an alkali metal halide of the present invention as the additive. Actually, when a life test was tried by using an ITO electrode, the cell voltage could be lowered as compared with a case of using the existent electrolytic solution (system containing quaternary ammonium salt).

For effectively providing such an advantageous effect, the alkali metal halide is added preferably at a concentration ratio from ½ to 5 times of the silver halide.

Cyanic solutions used for plating baths have been well-known for the deposition of silver from silver complex salts, but the cyanic solutions involve a problem in ensuring a safety working environment or in disposing liquid wastes. Then, the present inventor has noted on non-cyanic silver salts and made a study on them.

That is, a highly reversible system was obtained among various electrolytic solutions of silver complex salts by adding a reducing agent. The material used for the system is referred to as an RED (reversible electro-deposition) material, which is dissolved in a solvent and prepared as an RED solution.

The RED solution (electrolytic solution) has been studied so far on solutions using silver iodide as the silver halide, ascorbic acid as the reducing agent for improving the reversibility and dimethylsulfoxide (DMSO) as the non-aqueous solvent. While the working circumstance of a device tends to be restricted in a case of using a solvent having high reversibility for deposition or dissolution but of poor temperature characteristics such as DMSO, the temperature range can be extended by forming a mixed solvent.

Further, although an electrolytic solution at a level approximate to that for the practical use could be obtained, the device life was short since the transparent electrode as the substrate is deteriorated by repeating driving. In view of the above, it was attempted in the present invention to reduce the overvoltage upon deposition and dissolution of silver as an important factor of the life and, in addition, to improve the working life. In this case, if the overvoltage upon deposition of silver can not be controlled, the overvoltage for the dissolution of the deposited silver film could be reduced by co-precipitation with different kind of metal, for example, a copper salt such as a copper halide or by mixing ligands on silver in complex salts. In this case, the content of the different kind of metal is preferably from 0.1 to 100 mmol/L.

By the addition of such different kind of metal, overvoltage upon dissolution of the deposited silver film could be lowered and, as a result, abrupt degradation of the transparent electrode could be avoided. When the life test was tried by using an ITO electrode, the life was improved as compared with a system not containing Cu salts.

Further, since the optical device and the electrolytic solution of the present invention are disposed in an optical system, it is not desirable that the electrolytic solution has absorption in a visible light region (coloration). Usually, when a copper halide is dissolved in an organic solvent, the solution has absorption in the visible light region. In view of the above, the light absorption in the visible light region of the electrolytic solution could be avoided by using a dissolved copper salt and a clarifying material typically represented by triethanolamine and reducing the state of copper present in the solvent as: $Cu^{2+} \rightarrow Cu^+$.

That is, upon dissolving a silver halide into a solvent, and if the solution is colored, it is preferred to add a clarifying agent comprising at least one compound selected from the group consisting of triethanolamine, iminodiacetic acid, trans-1,2-cyclohexanediamine tetraacetic acid, nitrotriacetic acid, galactitol, ascorbic acid, triethanolamine borate, dimethylamine borane, dimethylthioformamide, N,N,N',N'-tetrakis(2-hydroxypropyl)ethylene diamine, ethylenediamine-N,N,N',N'-tetra azetinic acid, salicylic acid, 2-methylmercaptobenzimidazole, 1-allyl-2-thiourea, thiouracil, dimethylamineborane and tetrabutyl ammonium borate.

In the present invention, the silver halide takes place oxidation-reduction by the application of a voltage as shown in the following formula:

(Hydrogen Standard)

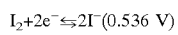

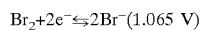

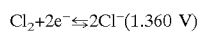

As described above, the present invention can provide an optical device which is of low power consumption, non-light emitting type and suitable to visible light region, for example, a display device or an optical filter by using an reversible system capable of depositing silver from a silver salt comprising a silver halide on an electrode and dissolving the same therefrom, and conducting coloration and discoloration.

In the optical device and the electrolytic solution of the present invention, when the different kind of metal is dissolved in the solution, it is desirable that the solution is not colored.

As the different kind of metal, copper is used which may be contained in a solution as the copper halide such as copper chloride or copper bromide.

The optical device and the electrolytic solution of the present invention can be constituted by filling an electrolytic solution, in which a silver halide is dissolved in a solvent, is disposed between and in contact with working electrodes and counter electrode at least one of which serves as an electrode for depositing or dissolving silver.

It is desirable that a solution in which a silver halide is dissolved in water or a non-aqueous solvent, particularly, a non-aqueous solution is disposed and colored or discolored by deposition or dissolution of silver.

In this case, it is desirable to use an RED solution in which the concentration of silver bromide is from 0.03 to 2.0 mol/L and, more preferably, from 0.05 to 2.0 mol/L.

Then, for electrochemical deposition and dissolution of silver, it is preferred to add at least one of additives selected from the group consisting of brightener, complexing agent and reducing agent to the solution.

For instance, at least one compound selected from the group consisting of thiourea, 1-allyl-2-thiourea. mercaptobenzoimidazole, cumarin, phthalic acid, succinic acid, salicylic acid, glycolic acid, dimethylamineborane (DMAB), trimethylamineborane (TMAB), tartaric acid, oxalic acid and D-glucono-1,5-lactone may be added as additives.

As the RED solution usable in the present invention, a system capable of dissolving the silver salt and highly reversible by the combined use with the reducing agent is desirable. For the RED solution, use of ascorbic acid for the reducing agent and only the non-aqueous solution comprising dimethylsulfoxide (DMSO) as the solvent were studied. However, since DMSO itself has a coagulation point at 18° C., such an RED solution involves the problem for the low temperature characteristics and tends to cause freezing during use in a cold district, for instance.

In view of the above, the present inventor used a solvent of low coagulation point capable of preventing degradation of the low temperature characteristics and enduring use at low temperature, particularly, in a non-aqueous reversible system of depositing silver from a silver salt on a transparent electrode and dissolving the same therefrom, and studied on a reducing agent adaptable thereto.

As a result, any of the reducing agents described above such as DMAB and TMAB, which were not taken into consideration at all so for, can be used satisfactorily as the reducing agent adaptable to the solvent of low coagulation point even when a solvent of a low coagulation point is used for the improvement of the low temperature characteristics, and the reducing agent mentioned herein is soluble more easily into the solvent of this type than ascorbic acid described previously. That is, since this forms an electrolytic solution that coagulates at a lower temperature than the DMSO system electrolytic solution, the electrolytic solution does not freeze even during use in the cold district. In this case, the reducing agent is added preferably within a concentration range from 1/150 to 1 times of the silver salt.

The solvent of low coagulation point is desirably, a solvent (non-aqueous solvent) comprising at least one compound selected from the group consisting of dimethylformamide (DMF), diethylformamide (DEF), N,N-dimethylacetamide (DMAA), N-methylpripionamide (MPA), N-methylpyrrolidone (MP), propylenecarbonate (PC), acetonitrile (AN), 2-methoxyethanol (MEOH), 2-ethoxyethanol (EEOH), dimethylsulfoxide (DMSO), dioxolane (DOL), ethylacetate (EA), tetrahydrofuran (THF), methyltetrahydrofuran (MeTHF), dimethoxyethane (DME) and γ-butyrolactone (GBL).

Among the non-aqueous solvents described above, when those of lower coagulation point compared with DMSO (particularly, the coagulation point of DMF, DEF, MEOH, EEOH is lower by more than 70° C.) are used, the RED solution prepared by dissolving a silver halide has excellent low temperature characteristics and are durable satisfactorily to the use, for example, in a cold district. Further, even when DMSO is used, if it is formed as a solvent mixture with acetonitrile or the like, for example, at 1:1 ratio, use at low temperature is enabled and a solvent having high reversibility for deposition and dissolution of silver but having poor temperature characteristics can also be used. As a result, the range for usable additives was extended. Further, by the development of the electrolytic solution not coagulated at low temperature, this electrolytic solution is not frozen even during use in the cold district.

Further, by chemically or physically modifying a transparent electrode as an operation electrode for depositing or dissolving silver (particularly, ITO electrode: obtained by doping tin to indium oxide), deposition potential of silver to the transparent electrode is lowered to facilitate deposition/dissolution of silver and electric damages on the transparent electrode or the solution per se can be moderated.

As the chemical modification in this case, a surface treatment (chemical plating) is preferably conducted to the ITO electrode with palladium or the like by a 2-solution treating method of a tin solution and a palladium solution. That is, the activity on the surface of the ITO electrode is increased by depositing palladium nuclei on a substrate consisting of ITO alone as the surface activation treatment of the ITO electrode with palladium.

In this case, a tin solution prepared by dissolving 0.10–1.0 g of tin chloride ($SnCl_2$) into one liter of 0.010–0.10% HCl and a palladium solution prepared by dissolving 0.10–1.0 g of palladium chloride ($PdCl_2$) into 1 liter of 0.010–0.10% HCl can be used.

Further, as the physical modification, it is possible to use a method of vapor depositing a metal which is more noble than silver on the ITO electrode.

For the optical device and the electrolytic solution according to the present invention, it is desirable that the solution has no absorption in the visible light region and that the ITO electrode having no absorption in the visible light region is preferably used as the substrate electrode for coloration and discoloration (that is, working electrode) in order to operate as an optical device.

Then, when coloration and discoloration states are repeated by using the RED solution, the solution system can not be stirred since the device is of a minute size. Accordingly, it is preferable to drive by an electric current control which facilitates quantization for electrochemical deposition/dissolution of silver.

As a coloration-discoloration driving method by the current control described above, it is preferred to use a driving method by an electric current changing from a high current value to a low current value in a square shape in order to increase coloration or discoloration speed (deposition or dissolution rate of silver). Alternatively, it is also preferred to use a driving method by an electric current changing from a low current value to a high current value in a rectangular shape in order to mitigate damages on the substrate caused by repeating deposition and dissolution of silver. In a case of using constant current driving, it is desirable to control by using a limiter or the like at a potential of forming side reaction products (in order to maintain the balance of electrolyte in the system).

The present invention is applicable generally in optical devices such as display devices capable of conducting numerical or character display or X–Y matrix display, and optical filters capable of controlling light transmittance or light reflectance in a visible light region (wavelength: 400 to 700 nm).

Further, the present invention also provides an electrolytic solution capable of being used in the optical device described above, that is, an electrolytic solution comprising a solution prepared by dissolving the silver halide, the support salt and the like described above in a solvent.

The electrolytic solution comprises a solution formed by dissolving a silver salt such as a silver halide in water or in a non-aqueous solvent preferably at a concentration from 0.03 to 2.0 mol/L, which is colored or discolored depending on deposition or dissolution of silver. The support salt or the additive of the present invention like that described above can be added and, depending on the case, gloss agent, completing agent, reducing agent and solvent may be added each in a predetermined amount to the solution.

DESCRIPTION OF THE PREFERRED EMBODIMENT

The present invention will be explained by way of preferred embodiments.

Figure 5:
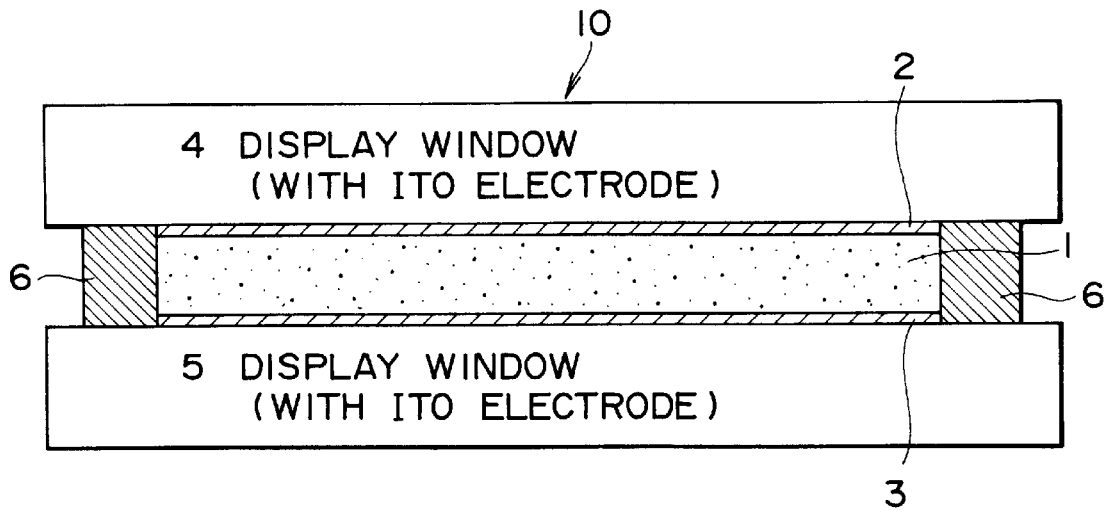
FIG. 5 is a schematic cross sectional view of an optical device.
Figure 6:
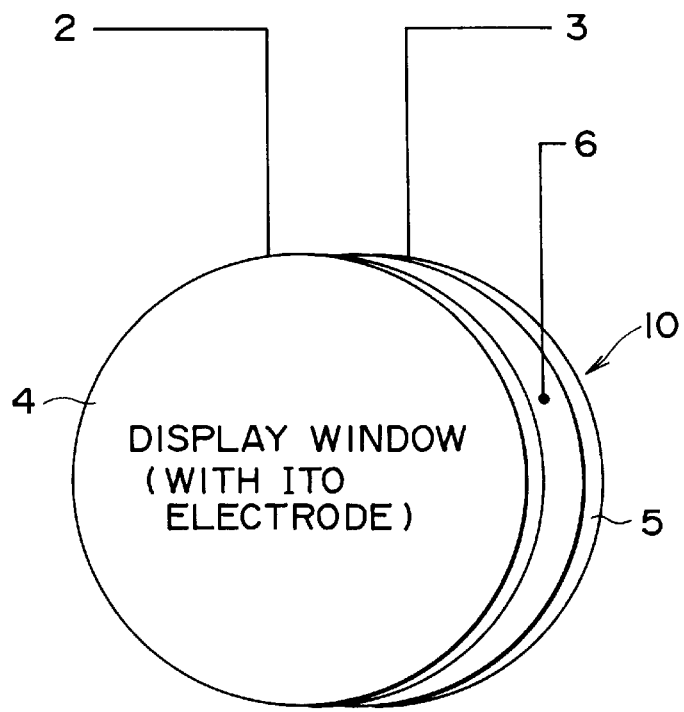
FIG. 6 is a conceptional view for the optical device.

At first, FIG. 5 and FIG. 6 schematically illustrate an example of an optical device 10 such as a display device (or optical filter) according to the embodiment of the present invention, According to the optical device 10 of this embodiment, a pair of cell-constituting transparent substrates (for example, glass plates) 4 and 5 are disposed spaced apart by a predetermined distance as display windows, and operation electrodes (for example, ITO electrode) 2 and 3 at least one of which operates as a coloring electrode or a discoloring electrode are disposed on the inner surfaces of the substrates respectively. While the operation electrodes are actually formed into patterns depending on the purpose but they are shown only schematically in the drawings.

Further, a counter electrode 6 is disposed also as a spacer for the entire circumference of the substrates 4 and 5, for which a silver plate is used for instance. Although not illustrated in the drawing, a silver wire, for example, is disposed as a reference electrode.

Then, between the opposed working electrodes 2 and 3, and the counter electrode 6, an RED solution 1 in which a silver halide (silver salt) and an alkali metal halide and the like are dissolved in a non-aqueous solvent is sealed as the RED material being in contact with the electrodes. When a DC driving voltage is applied for a predetermined period of time between the opposed working electrodes 2 and 3, and the counter electrode 6, one of them operating as an anode, while the other of them operating as a cathode, silver (complex) salt undergoes oxidation-reduction on the cathode as:

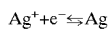

and the transparent state is transferred into a colored state by Ag deposition products.

When Ag is thus deposited on the electrode, a specific color (for example, reflection color) by Ag deposition products can be observed through the display window having the working electrode and it constitutes a filter material. The filtering action by the coloration, namely, the transmittance or reflectance for visible light (or color density) changes along with the level of the voltage and application time thereof and it can be operated as a variable transmittance or reflectance display device or filter by controlling them.

Figure 7:
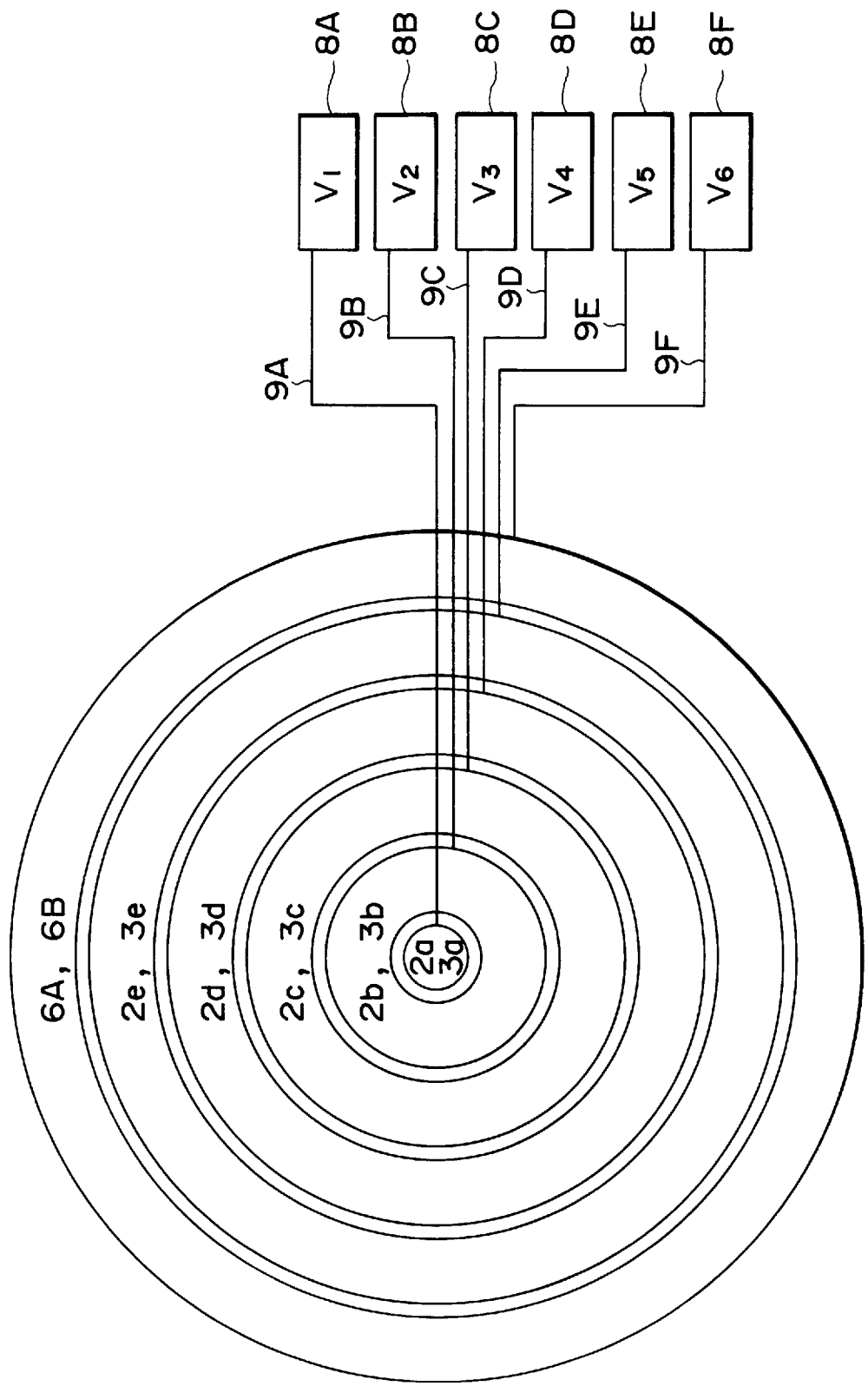
FIG. 7 is a pattern for an actual ITO electrode of the optical device.
Figure 8:
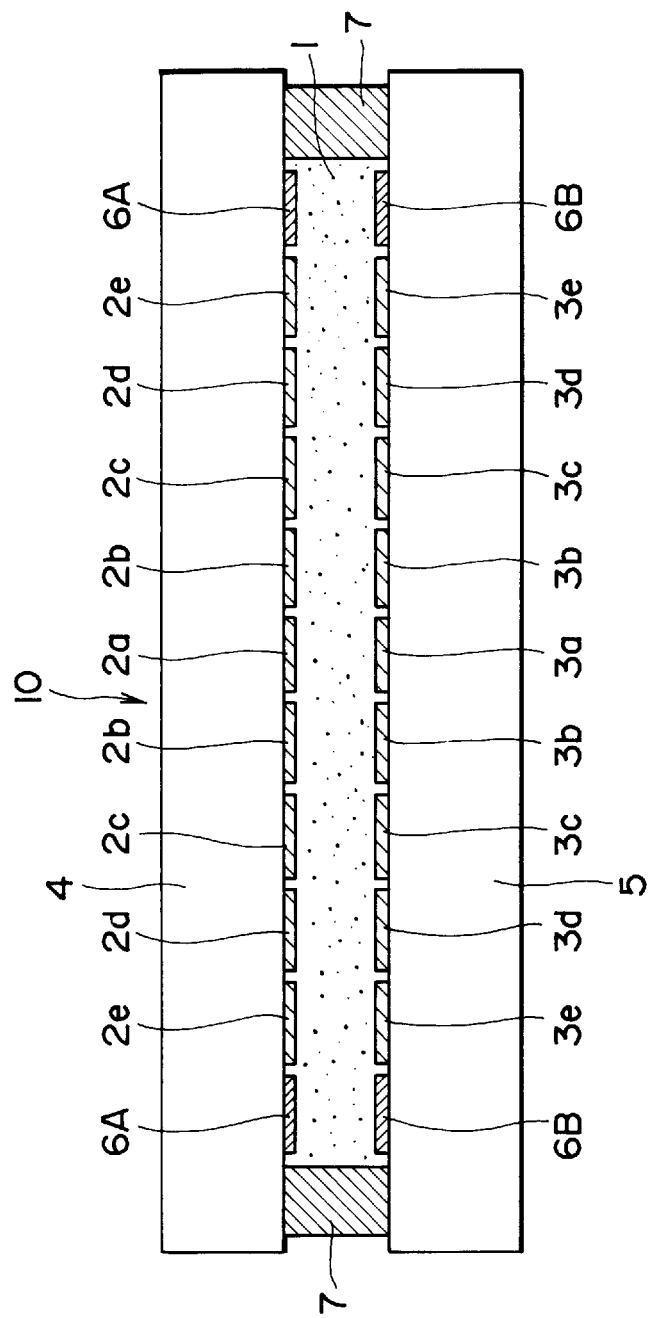
FIG. 8 is a schematic cross sectional view of the optical device.

The optical device 10 may have the opposed electrodes 2 and 3 substantially over the entire surface of the cell but, actually, it can be constituted, for example, as shown in FIGS. 7 and 8.

Namely, the opposed electrodes made of ITO disposed to the transparent substrates 4 and 5 are respectively divided into central portion 2a, 3a, and annular electrodes 2b, 3b; 2c, 3c; 2d, 3d; and 2e, 3e disposed coaxially each at a minute interval. Silver counter electrodes 6A, 6B for potential compensation are disposed around the circumference of the opposed electrodes 2e, 3e at the outermost circumference.

Each of the electrodes 2a, 3a; 2b, 3b; 2c, 3c; 2d, 3d; 2e, 3e; and 6A, 6B is connected respectively to each of driving power sources 8A, 8B, 8C, 8D, 8E and 8F by way of each of wirings 9A, 9B, 9C, 9D, 9E and 9F made of fine chromium wires.

The transparent substrates 4 and 5 are disposed at a predetermined gap by a spacer 7 (counter electrode 6 serves also as the spacer in FIG. 6), and an RED solution 1 is sealed in the gap.

Since the oxidation-reduction reaction (that is, density) in the RED solution 1 is controlled depending on the level of the applied voltage, the deposition amount of silver from the RED solution on the cathode of each of the divided electrodes can be changed by the voltage applied between each of the divided electrodes 2a–3a, 2b–3b, 2c–3c, 2d–3d and 2e–3e (referred to as $V_1$, $V_2$, $V_3$, $V_4$, and $V_5$) (voltage $V_6$ for potential compensation is applied also between the paired electrodes 6A–6B).

Accordingly, if all the voltages are made equal ($V_1=V_2=V_3=V_4=V_5$), uniform coloration can be attained over the entire area of the RED solution 1, and the degree of density can be changed uniformly in accordance with the voltage.

Further, if the application voltage to each of the electrodes is made different, for example, as $V_1<V_2<V_3<V_4<V_5$, the colored density is increased (in other words, light transmission is reduced) from the central portion to the periphery. This is useful, for example, as an optical diaphragm for CCD (Charge Coupled Device) for use in a television camera or the like and it can satisfactorily cope with the improvement for the integration degree of the CCD. If the relation of the application voltage is made opposite to the above, the light transmittance increases from the central portion to the periphery.

As described above, difference of density or gradation can be controlled in various patterns by the application voltage to the divided electrodes, which is useful as an optical filter and can extend the range of the state in use.

As has been described above, according to this embodiment, the density upon coloration of the RED material can be changed by using the RED material comprising silver bromide as a filter material for the control of light amount of optical instruments based on the idea quite different from the existent EC materials and conducting driving control for the working electrode and the counter electrode (particularly, voltage application), and it is possible to provide the display device or the optical filter with gradation by utilizing the features described above. Accordingly, it is possible to provide a filter which is fine in the size and consumes less electric power and has a higher performance than the existent variable ND filter operated mechanically as a light amount controlling device.

Then, description will be made more in details with reference to a concrete example of this embodiment. In the following examples, an optical device constituted as in the embodiment shown in FIG. 5 and FIG. 6 was also used.

EXAMPLE 1
(Comparison of polarization between quaternary ammonium salt and lithium halide)

Quaternary ammonium salt or lithium halide was used as a support electrolyte (support salt), corresponding electrolytic solutions were prepared respectively and polarization was compared in constant current driving. In this example, an ITO electrode of diameter 7 mm (7 mm $\phi$) was used to define the reaction area.

An electrolytic solution 1 was prepared by dissolving 500 mmol/L of AgBr as a silver salt and 500 mmol/L of tetra-n-butyl ammonium iodide (tetra-n-butyl ammonium I) as a quaternary ammonium salt into DMSO. Further, an electrolytic solution 2 was prepared by dissolving 500 mmol/L of AgBr and 500 mol/L of LiBr into DMSO.

Figure 1:
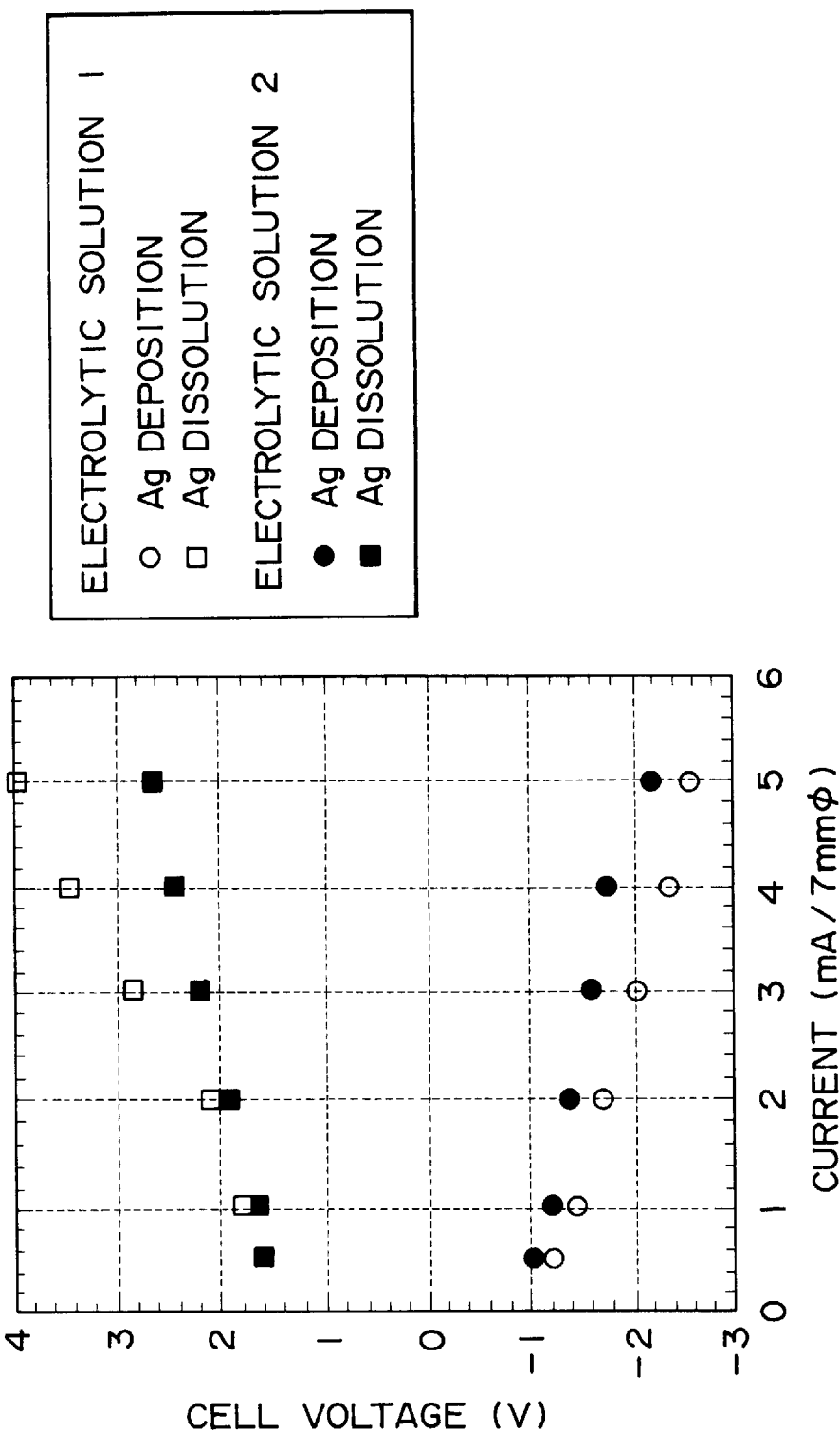
FIG. 1 is a graph illustrating the change of characteristics of an optical device depending on the application voltage.

Polarization was compared by using each of the electrolytic solutions. The result is shown in FIG. 1. It can be seen that the cell voltage of the electrolytic solution 2 in this example is lower than that of the electrolytic solution 1.

EXAMPLE 2
(Comparison of polarization between quaternary ammonium salt and sodium halide)

An electrolytic solution 1 was prepared by dissolving 500 mol/L of AgBr as the silver salt and 500 mmol/L of tetra-n-butyl ammonium iodide (tetra-n-butyl ammonium I) as the quaternary ammonium salt into DMSO. Further, an electrolytic solution 3 was prepared by dissolving 500 mmol/L of AgBr and 500 mmol/L of NaBr into DMSO.

Figure 2:
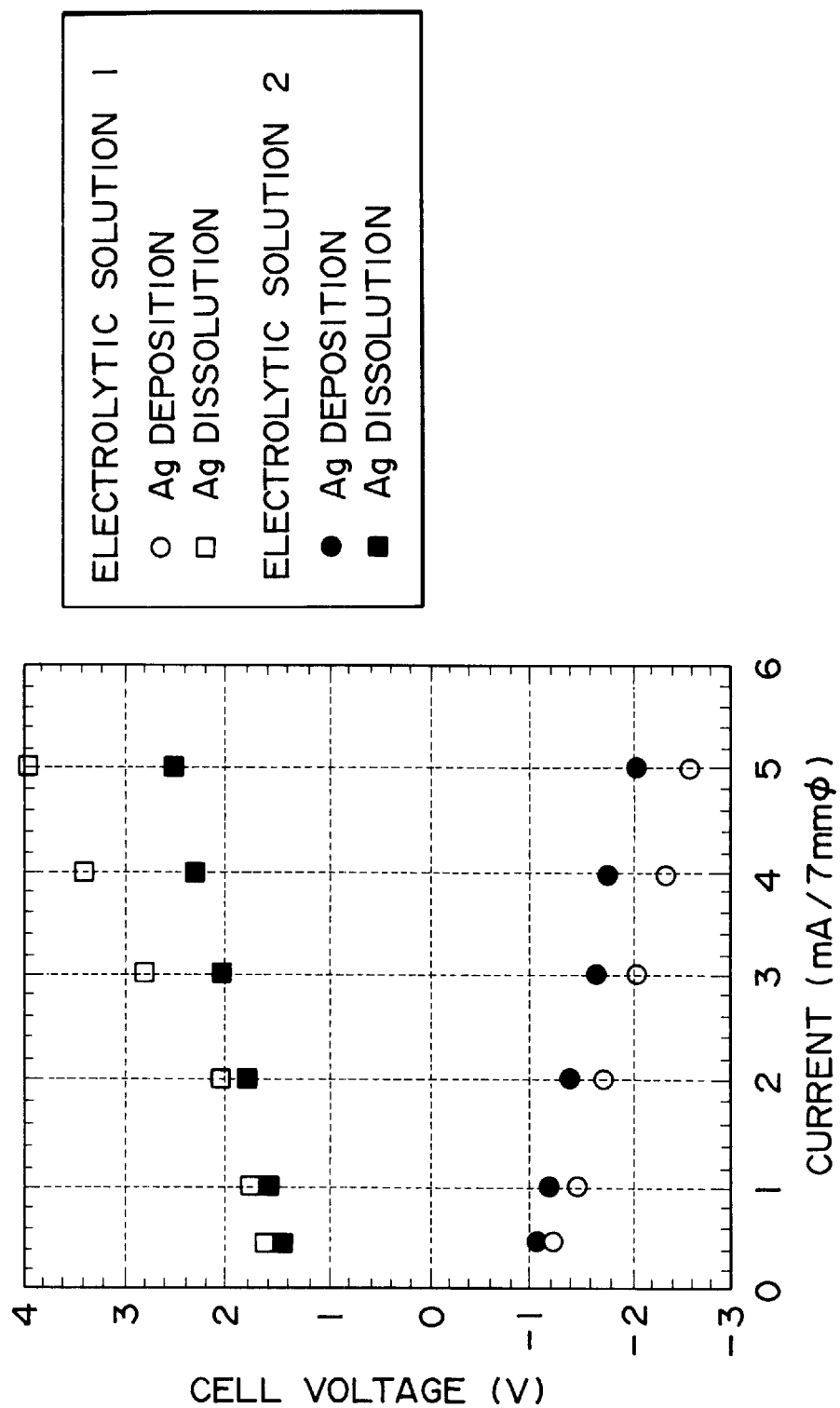
FIG. 2 is a graph illustrating the change of characteristics of another optical device depending on the application voltage.

Polarization was compared by using each of the electrolytic solutions. The result is shown in FIG. 2. It can be seen that the cell voltage of the electrolytic solution 3 in this example is lower than that of the electrolytic solution 1.

EXAMPLE 3

(Change of transmittance in silver deposition/dissolution using constant potential method)

Deposition/dissolution of silver by a constant potential method was tried using the electrolytic solution 2 in Example 1 and the change of the transmittance was measured.

Figure 3:
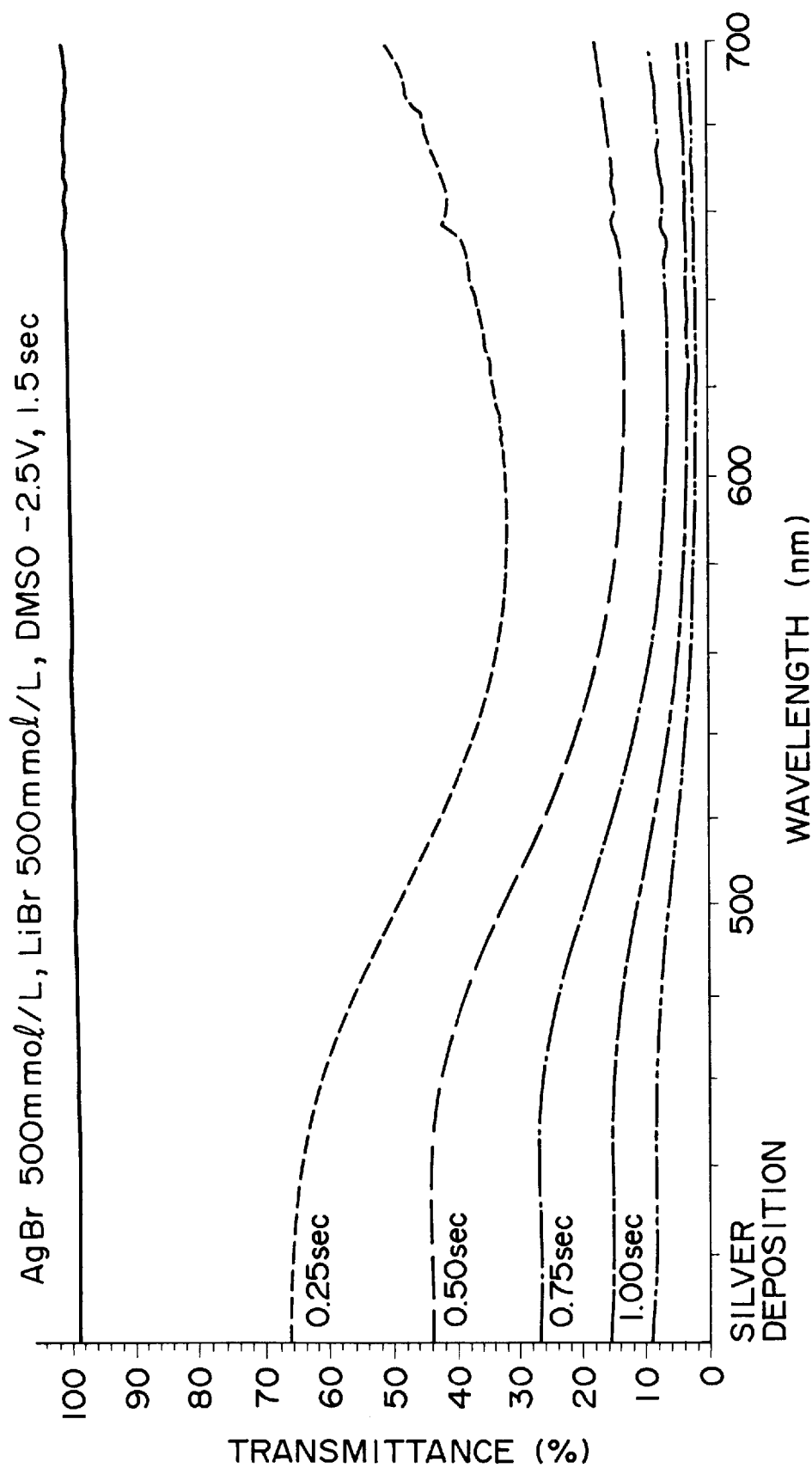
FIG. 3 is a spectral chart illustrating the change of transmittance by the application voltage upon coloration of an optical device according to the present invention.
Figure 4:
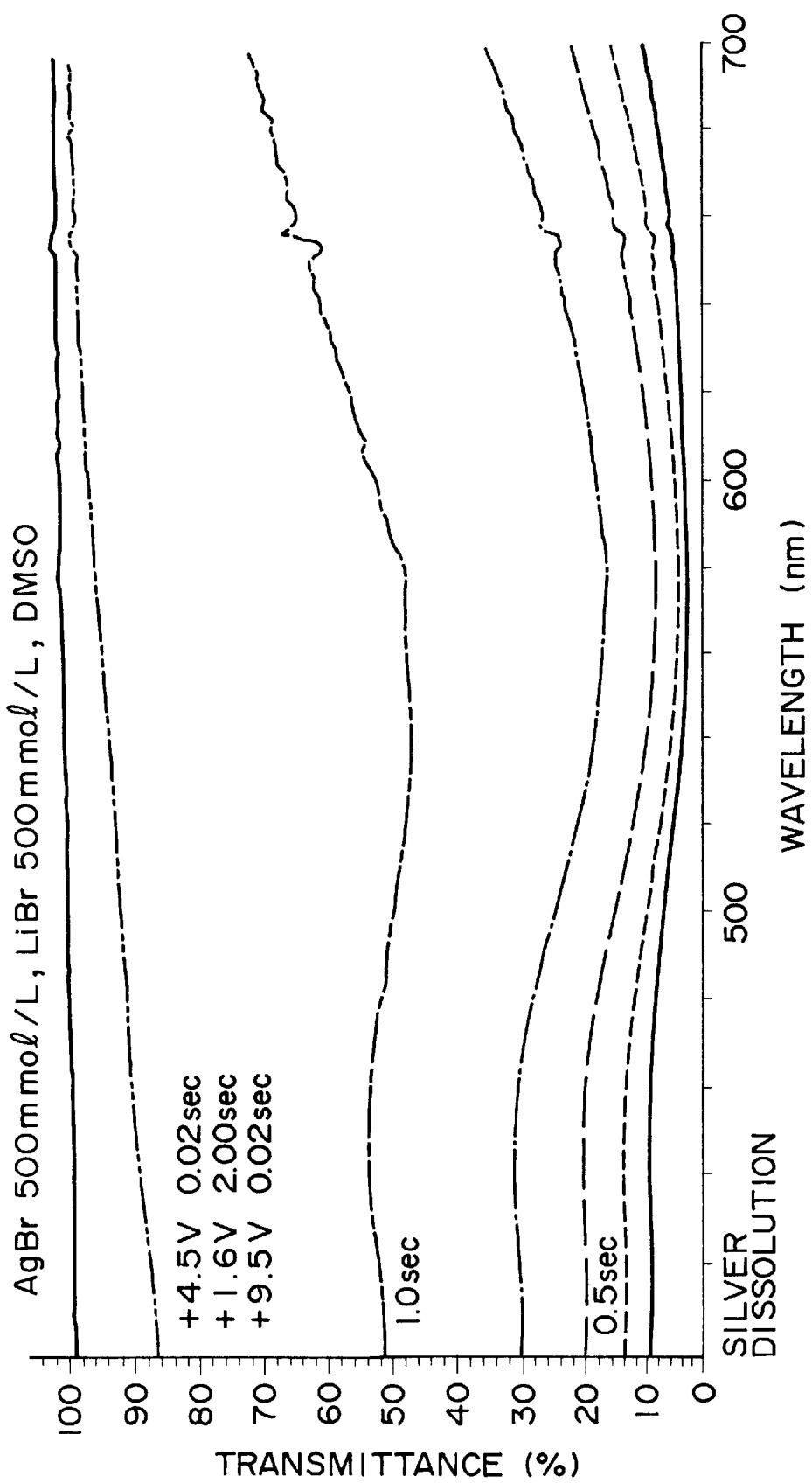
FIG. 4 is a spectral chart illustrating the change of transmittance by the application voltage during discoloration of the optical device.

During deposition, the driving voltage was −2.5 V to silver and the driving time was 1.5 sec. On the contrary, driving by the driving voltage during dissolution was stepwise, and it was +4.5 V for 20 msec →+1.6 V for 2 sec →+3.5 V for 20 msec to silver. Change of the transmittance for each of them is shown in FIG. 3 (during deposition) and FIG. 4 (during dissolution). The transmittance is based on the transmittance of the ITO electrode.

From the result, it can be seen that the light amount can be controlled (transmittance can be changed) in the case of using this electrolytic solution and it is shown that the deposited silver film in this system has spectral characteristics of a uniform absorption in the visible light region and the transmittance increases and decreases in the same manner both in deposition and dissolution and light shielding performance is provided in the visible light region.

While the embodiments of the present invention have been explained, the foregoing embodiment can be further modified on the basis of the technical idea of the present invention.

For instance, the kind of the RED material and components in the RED solution, particularly, the kind, the concentration and the like of the support salt comprising the alkali metal halide may be changed variously.

Further, the structure including the ITO electrode pattern, as well as the material for each of the constituent portions and, further, the driving method are not restricted only to those described above. For example, the electrode pattern shown in FIG. 7 may be changed variously, for example, into a stripe shape or a lattice-like shape. Alternatively, cells of different RED solutions may be divided and arranged on every divisional electrodes. In this case, the RED solution can be combined with the existent EC solution.

Further, the optical device according to the present invention can be combined, for example, with other known filter materials (for example, an organic electrochromic materials. Liquid crystals and electroluminescent materials). Further, the optical device according to the present invention is applicable generally to optical diaphragms for CCD, as well as various kinds of optical systems, and electrophotographic copying machines or light communication equipments for controlling optical amount.

As has been described above, in the present invention, a reversible system of depositing/dissolving silver on the electrode by the driving control (particularly, voltage application) of the working electrodes and counter electrode by adding the support salt such as LiX in the RED solution containing silver halide based on the concept quite different from that of the existent EC material. Accordingly, it is possible to provide an optical device which consumes less electric power, is a not-light emission type and suitable to the visible light region, as well as to reduce the overvoltage to the electrode thereby improving the working life.

What is claimed is:

1. An optical device, in which a silver halide solution is disposed between working electrodes and counter electrode, which is adapted to cause deposition or dissolution of silver by driving control of the electrodes, and in which at least one salt selected from the group consisting of LiX, NaX and KX (in which X is a fluorine atom, chlorine atom, bromine atom or iodine atom) is added as a support salt for dissolving said silver halide capable of supplying a halogen identical with or different from that of said silver halide and the silver halide is formed into a complex salt.

2. An optical device as defined in claim 1, wherein the support salt is added within a range of concentration from ½ to 5 times of the silver halide.

3. An optical device as defined in claim 1, wherein an electrolytic solution, in which a silver halide is dissolved in a solvent, is filled between and in contact with the working electrodes and counter electrode at least one of which constitutes an electrode for deposition or dissolution of silver.

4. An optical device as defined in claim 1, wherein a solution, in which a silver halide is dissolved in water or a non-aqueous solvent, is disposed and colored or discolored in accordance with deposition or dissolution of silver.

5. An optical device as defined in claim 4, wherein the non-aqueous solvent comprises at least one compound selected from the group consisting of dimethylformamide, diethylformamide, N,N-dimethylacetamide, N-methylpropionamide, N-methylpyrrolidone, propylenecarbonate, acetonitrile, 2-ethoxyethanol, 2-methoxyethanol, dimethylsulfoxide, dioxolane, ethylacetate, tetrahydrofuran, methyltetrahydrofuran, dimethoxyethane and γ-butyrolactone.

6. An optical device as defined in claim 1, wherein a solution at a silver halide concentration of from 0.03 to 2.0 mol/L is used.

7. An optical device as defined in claim 1, wherein at least one additive is added to the solution for electrochemical deposition or dissolution of silver.

8. An optical device as defined in claim 7, which uses, as an additive, at least one compound selected from the group consisting of thiourea, allyl thiourea, mercaptobenzimidazole, cumarin, phthalic acid, succinic acid, salicylic acid, glycolic acid, dimethylamineborane, trimethylamineborane, tartaric acid, oxalic acid and gluconic lactone.

9. An optical device as defined in claim 1, wherein a transparent electrode as an operation electrode for deposition or dissolution of silver is made of indium-tin oxide.

10. An optical device as defined in claim 9, wherein the transparent electrode is modified chemically or physically.

11. An electrolytic solution comprising a silver halide solution disposed between working electrodes and counter electrode and causing deposition or dissolution of silver by driving control of the electrodes, wherein at least one salt selected from the group consisting of LiX, Nax and KX (in which X is fluorine atom, chlorine atom, bromine atom or iodine atom) as a support salt capable of supplying a halogen identical with or different from that of the silver halide for dissolution of the silver halide, and whereby the silver halide is formed into a complex salt.

12. An electrolytic solution as defined in claim 11, wherein the support salt is added within a range of concentration from ½ to 5 times of the silver halide.

13. An electrolytic solution as defined in claim 11, wherein an electrolytic solution, in which a silver halide is dissolved in a solvent, is filled between and in contact with working electrodes and counter electrode at least one of which constitutes an electrode for deposition or dissolution of silver.

14. An electrolytic solution as defined in claim 11, wherein a solution in which a silver halide is dissolved in water or a non-aqueous solvent is colored or discolored by deposition or dissolution of silver.

15. An electrolytic solution as defined in claim 14, wherein the non-aqueous solvent comprises at least one compound selected from the group consisting of dimethylformamide, diethylformamide, N,N-dimethylacetamide, N-methylpropionamide, N-methylpyrrolidone, propylenecarbonate, acetonitrile, 2-ethoxyethanol, 2-methoxyethanol, dimethylsulfoxide, dioxolane, ethylacetate, tetrahydrofuran, methyltetrahydrofuran, dimethoxyethane and γ-butyrolactone.

16. An electrolytic solution as defined in claim 11, wherein the concentration of the silver halide is from 0.03 to 2.0 mol/L.

17. An electrolytic solution as defined in claim 11, wherein at least one additive is added for electrochemical deposition or dissolution of silver.

18. An electrolytic solution as defined in claim 17 which uses, as additives, at least one compound selected from the group consisting of thiourea, allyl thiourea, mercaptobenzimidazole, cumarin, phthalic acid, succinic acid, salicylic acid, glycolic acid, dimethylamineborane, trimethylamineborane, tartaric acid, oxalic acid and gluconic lactone.

19. An electrolytic solution as defined in claim 11, wherein a transparent electrode as an operation electrode for deposition or dissolution of silver is made of indium-tin oxide.

20. An electrolytic solution as defined in claim 19, wherein the transparent electrode is modified chemically or physically.

* * * * *